INVENTORS
FRED C. KELLY
BY
ATTORNEY

Jan. 10, 1967   F. C. KELLY   3,296,934
BORING MACHINE FOR SEMI-CYLINDRICAL BEARINGS
Filed Nov. 25, 1964   3 Sheets-Sheet 2

INVENTORS
FRED C. KELLY

BY Eber J. Hyde
ATTORNEY

Jan. 10, 1967     F. C. KELLY     3,296,934
BORING MACHINE FOR SEMI-CYLINDRICAL BEARINGS
Filed Nov. 25, 1964     3 Sheets-Sheet 3

INVENTOR.
FRED C. KELLY
BY
*Eber J. Hyde*
ATTORNEY

United States Patent Office 3,296,934
Patented Jan. 10, 1967

3,296,934
BORING MACHINE FOR SEMI-CYLINDRICAL
BEARINGS
Fred C. Kelly, Cleveland, Ohio, assignor to Clevite
Corporation, a corporation of Ohio
Filed Nov. 25, 1964, Ser. No. 413,841
6 Claims. (Cl. 90—26)

This invention relates to a high speed boring machine for semi-cylindrical bearings.

This invention is an improvement on the invention disclosed in United States application Serial No. 224,673, filed Sept. 19, 1962, now abandoned, in the names of Marius J. Merlin, Kenneth J. Mathews and Glenn F. Richmond, for Boring Machine for Semi-Cylindrical Bearings, and assigned to the same assignee as the present invention.

In the mass production of highly precise sleeve bearings of the semi-cylindrical type, extreme care must be exercised to maintain dimensional tolerances on the order of a few tenths of thousandths of an inch and the smoothness of the bearing surface should be better than 30 microinches R.M.S. Further, the bearing surface must not have waviness. The above conditions must be maintained, and in addition the tool which provides the final dimensioning and smoothing of the bearing surface must be able to produce a large number of pieces per minute to be economically feasible.

In the past broaching machines have been used for this purpose and could not hold the tolerances and surface conditions required. However, the bearings produced had to undergo hand deburring. Milling cutters, in addition to being very slow, cannot hold the tolerances required and cannot provide the finish required.

Semi-circular bearings have previously been produced by a boring process, but the rate of rotation of the boring bar was only about 2000 r.p.m., and consequently the rate of production of the finished bearings was very low. In the present invention the rate of rotation of the boring bar is an order of magnitude greater than in the past, introducing problems not hitherto encountered. Rates of rotation at 20,000 to 30,000 r.p.m. have been used. These rates are far above the rates possible with a milling cutter. The problem solved by the present invention is to produce high quality sleeve bearings at an extremely high rate, hour after hour without shutting down for tool maintenance, and to produce the bearings in such a manner that hand deburring is not required.

The present invention provides a high speed boring machine for finish boring sleeve bearings to close tolerances and to extremely close surface waviness and roughness requirements.

An object of the invention is to machine the inner periphery of a semi-cylindrical bearing to size and to final condition in one operation.

Another object of the invention is to finish bore the inside diameter bearing surface and the surfaces of the parting line relief areas of a semi-cylindrical bearing in one high speed operation.

Another object of the invention is to provide a boring machine wherein the motor drive shaft axis and the boring bar axis are extremely accurately aligned, and wherein the bearing means supporting the motor drive shaft is decoupled from the bearing means supporting the boring bar. This virtually eliminates beat frequency vibrations set up between the bearings, which vibration otherwise causes the tool tip to vibrate out of its normal path and to cut a visible pattern in the face of the object being bored.

Another object of the invention is to machine the inside diameter bearing surface and the surfaces of the parting line relief areas of a semi-cylindrical bearing in such a manner that a better surface finish is obtained than has been obtained in the past and so that all of these surfaces are free of burrs, and to do it by a very high speed boring process.

Still another object of the invention is to provide an extremely high speed boring device to finish bore sleeve bearings to final dimension, and to control surface waviness and roughness of the bearing surface to maintain both of these characteristics below certain values.

Another object of the present invention is to compensate for slight misalignment between the fixed axis of a high speed boring bar and the fixed axis of the motor driving the bar.

For a better understanding of the present invention, together with other and further objects thereof, reference is had to the following description taken in connection with the accompanying drawings, and its scope will be pointed out in the appended claims.

With reference to the drawings there is shown in FIGURE 1 a partly elevational and a partly sectional view of a portion of a boring machine;

In the past it has been the practice to reduce the inner periphery of a semi-cylindrical bearing to size by broaching. A broaching machine includes a bar and two or more spaced circular cutters fixedly secured to the bar. The semi-cylindrical bearing is held in position and the bar and the circular cutters are moved through the semi-cylindrical bearing to remove metal from the inner periphery of the bearing and from relief areas in the inner periphery of the bearing adjacent to the parting line faces of the bearing. The bar is mounted in the broaching machine for reciprocating movement only and does not rotate. Therefore the circular cutters do not rotate when they pass through the semi-cylindrical bearing and remove metal from the inner periphery of the semi-cylindrical bearing. After the inner periphery of the semi-cylindrical bearing has been broached to size burrs remain on the inner periphery of the bearing around holes, oil grooves, notch, and at the trailing edge of the bearing. Another operation is necessary to remove the burrs from the semi-cylindrical bearing.

Also, in the past slow speed milling cutters have been used to mill to final dimension the bearing surface of large railroad journal bearings. This is a slow process as the milling cutters are limited in their rotational speed, and milling cutters cannot be used to obtain the desired high degree of surface smoothness required of smaller automotive sleeve bearings. A milling cutter removes metal from the face of the bearing in a series of short arcuate bites as successive teeth engage the bearing surface. Since the teeth of the cutter are not identical the required surface smoothness cannot be obtained.

Figure 5:
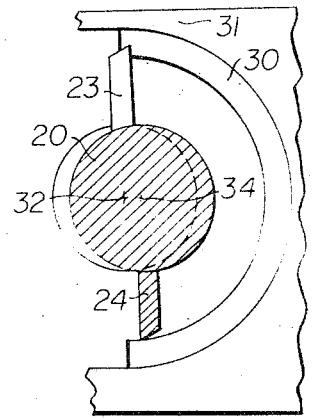
FIGURE 5 is a schematic cross-sectional view through the boring bar and a top plan view of the cutters and the semi-cylindrical bearing and the bearing holder just before the cutters pass through the semi-cylindrical bearing.
Figure 4:
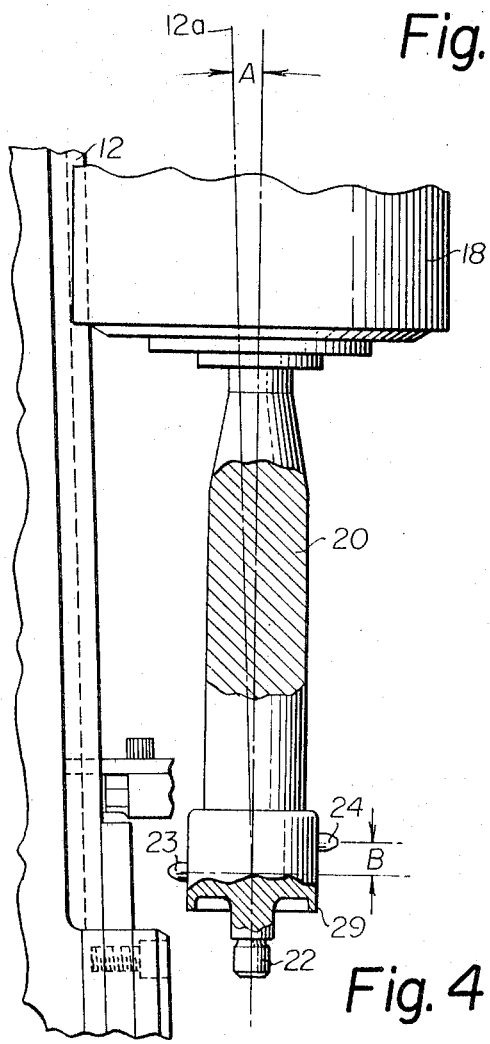
FIGURE 4 is a partly elevational and partly sectional view of a portion of the boring machine exaggerating the angle at which the boring bar is mounted.

In the present invention, a boring bar is mounted in a boring machine for both reciprocating movement and for rotation at a very high speed. Rates between 18,000 and 30,000 r.p.m. are achieved. A pair of cutters are spaced longitudinally of the boring bar and are fixedly secured to the boring bar with one cutter extending slightly beyond the other cutter. The boring bar is mounted in the boring machine so that the longitudinal axis of the boring bar is at a small angle from the line of reciprocating movement of the boring bar. A semi-cylindrical bearing is held in position and the boring bar and the pair of cutters are moved adjacent the bearing with the pair of cutters rotating to remove metal from the inner periphery of the bearing, resulting in the formation of parting line relief areas in the inner periphery of the bearing adjacent the parting line faces of the bearing. Since the boring bar is at an angle in respect to the line of reciprocation of the boring bar, and since the two cutters are spaced apart axially of the boring bar and one is slighlty longer than the other, the result is the simultaneous cutting of arcs of two different circles on the inner periphery of the semi-circular bearing. The cutter describing an arc with the smaller radius cuts the bearing surface and the cutter describing the arc with the larger radius cuts the parting line relief areas. As shown in FIGURE 4, the cutter end of the boring bar 20 is tiled so that it is closer to the slide 10 than the upper or motor end of the mechanism. The bearing, when it is being bored, is indexed in toward the cutters, as shown in FIGURE 5, and the longer cutter 23 rotates about a center 32 which is farther away from the bearing 30 than is the center 34 about which the shorter cutter 24 rotates. If, however, the boring bar were to be tilted in the opposite direction so that the cutters were farther away from the slide 10 and closer to the bearing 30, then the cutter 23 should be slightly shorter than the cutter 24. A few thousandths of an inch difference in length between the cutters 23 and 24 is sufficient to produce satisfactory parting line relief areas.

This boring operation reduces the inner periphery of the bearing to size so that it is now ready for use. Due to the extremely high rate of rotation the boring machine can rapidly traverse the bearing and the boring operation does not produce burrs on the inner periphery of the semi-cylindrical bearing around holes, oil grooves, notch and at the trailing edge of the bearing, and it maintains a very high degree of surface smoothness. Therefore, a second operation to remove burrs is eliminated, and a third operation to smooth the bearing surface is unnecessary. Thus the applicant's invention is more economical than broaching. It is believed that in some respects applicant's invention gives a better surface finish on the inner periphery of the semi-cylindrical bearing between the parting line relief areas and also gives a better surface finish on the surfaces of the parting line relief areas than is obtained by broaching.

The extremely high rate of rotation of the boring bar introduces problems of its own which are not present in broaching machines or in slow speed milling cutters or prior art boring machines. The boring bar must not whip. If it does, it introduces surface waviness to the machined surface of the bearing. In order to keep this surface waviness below an acceptable value both ends of the boring bar must be fixed.

In the drawings, 10 designates a portion of the frame of a boring machine provided with a dovetail groove 11. A slide 12 is positioned in the groove 11 in the frame 10 for reciprocal movement in the groove relative to the frame. A cylinder 13 is fixedly secured to the frame 10 and a piston 14 is disposed in the cylinder. A piston rod 15 is fixedly secured to the piston 14 and projects from the cylinder 13. The piston rod 15 is also fixedly secured to the slide 12. A conduit 16 is in communication with the upper interior of the cylinder 13 and a conduit 17 is in communication with the lower interior of the cylinder. When fluid under pressure flows through the conduit 16 into the cylinder 13 fluid is exhausted from the lower interior of the cylinder through the conduit 17 and the piston 14 moves the slide 12 downwardly in the direction of its longitudinal axis. When fluid under pressure flows through the conduit 17 into the cylinder 13 fluid is exhausted from the upper interior of the cylinder through the conduit 16 and the piston 14 moves the slide 12 upwardly in the direction of its longitudinal axis. Thus the piston rod 15 and the piston 14 and the cylinder 13 reciprocate the slide 12 in the frame 10 along the longitudinal axis.

An electric motor 18 is fixedly secured to the slide 12 and has a motor shaft 19. A boring bar 20 has one end 21 fixedly secured to the motor shaft 19 and has its other end 22 of a smaller diameter. A first cutter 23 is fixedly mounted in the boring bar 20 and a second cutter 24 is fixedly mounted in the boring bar 20 at a location slightly spaced axially of the first cutter, as will be described later. One of the cutters has a radius which is a few thousandths of an inch greater than the other.

The cuter 24 is spaced longitudinally of the boring bar 20 from the cutter 23 by a distance of one-half inch as shown at B in FIGURE 4. The cutter 24 is spaced 180° on the boring bar 20 from the cutter 23 as shown in FIGURES 4 and 5. The electric motor 18 rotates the boring bar 20 causing rotation of the cutters 23 and 24.

Figure 3:
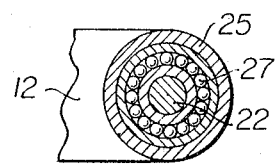
FIGURE 3 is a view taken on the line 3—3 of FIGURE 1.

If the end 22 of the boring bar 20 is not supported centrifugal force will cause whipping of the free end thereof, so means are provided to support the end 22 of the boring bar 20 while the boring bar is rotating. Whipping is movement of the center of the end 22 of the boring bar 20 outside of the longitudinal axis of the boring bar through the center of the end 21 of the boring bar. This results in severe waviness conditions in the bored surface. This support means includes a structure 25 made integral with the slide 12. The upper end of the structure 25 is circular in cross section as shown in FIGURE 3. The structure 25 is provided with a circular recess 26. A ball bearing 27 is mounted on the end 22 of the boring bar 20 and is also mounted in the recess 26 in the structure 25. A lock nut 28 is threaded on the end 22 of the boring bar 20 to hold the ball bearing 27 on the boring bar. A rim 29 is made integral with the boring bar 20 and surrounds the structure 25 and is spaced from the structure 25. Thus the ball bearing 27 rotatably mounts the end 22 of the boring bar 20 in the structure 25 and this arrangement prevents whipping of the end 22 of the boring bar at high speeds. The boring bar 20 is disposed at an angle A of less than one degree with respect to the longitudinal axis of the slide 12. In the preferred embodiment of the invention the angle A is about 48 minutes.

Figure 6:
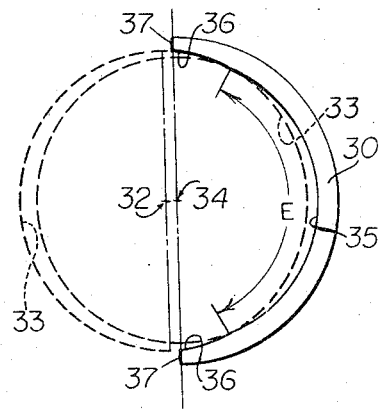
FIGURE 6 is an end view of the semi-cylindrical bearing after material has been removed from its inner periphery by the cutters of the boring machine.

The operation of the boring machine is as follows: One of the semi-cylindrical bearings 30 is placed in the holder 31 and the holder is moved forward to a position directly below the boring bar 20 and the cutters 23 and 24 so that the longitudinal axis of the semi-cylindrical bearing is parallel to the longitudinal axis of the slide 12. The electric motor 18 is then turned on so that the motor shaft 19 rotates causing rotation of the boring bar 20 and the cutters 23 and 24. A control means is then actuated so that fluid under pressure flows through the conduit 16 into the cylinder 13 and fluid exhausts from the lower interior of the cylinder through the conduit 17 causing the piston 14 and the piston rod 15 and the slide 12 and the electric motor 18 and the boring bar 20 and the cutters 23 and 24 to move downwardly so that the cutters 23 and 24 move adjacent the semi-cylindrical bearing 30 and remove metal from the inner periphery of the semi-cylindrical bearing 30. The cutter 23, which has the larger radius, first moves adjacent the semi-cylindrical bearing 30 and rotates about a center 32 to remove metal from the entire inner periphery of the semi-cylindrical bearing as indicated by the dotted line 33 in FIGURE 6. The cutter 24, which has the smaller radius, then moves adjacent the semi-cylindrical bearing 30 and rotates about a center 34 to remove metal from the inner periphery of the semi-cylindrical bearing along the arc E indicated in FIGURE 6 to form the surface 35 on the inner periphery leaving parting line relief areas 36 adjacent the parting line faces 37 of the semi-cylindrical bearing. The cutter 24 performs a finishing operation on the semi-cylindrical bearing 30 by machining the surface 35 on the semi-cylindrical bearing. The radius of the cutter 23 must be slightly greater than the radius of the cutter 24 to perform the removal of metal from the inner periphery of the semi-cylindrical bearing as above described. The holder 31 then releases the finished semi-cylindrical bearing 30 and the bearing falls onto a conveyor. The conveyor carries the finished semi-cylindrical bearing 30 to a stacked position for removal by the operator. The control means is then actuated to cause fluid under pressure to flow through the conduit 17 into the cylinder 13 and move the piston 14 upwardly with fluid being exhausted from the upper interior of the cylinder 13 through the conduit 16 causing the slide 12 and the electric motor 18 and the boring bar 20 and the cutters 23 and 24 to be moved upwardly out of cutting position. The operation is then repeated by placing another semi-cylindrical bearing in the holder 31.

The advantages of applicant's invention are as follows: In one boring operation arcs of two different circles are cut and the circles have different radii. One arc forms the contact area E of the bearing and two other arcs, one either side of the contact area, form the parting line relief areas for the reception of oil as a journal turns relative to the bearing, as is known in the art. There is a better surface finish on the surface 35 and a better surface finish on the bottoms of the parting line relief areas 36 of the semi-cylindrical bearing 30 than is obtained by broaching. There are no burrs produced on the semi-cylindrical bearing 30 by the boring operation. Therefore, a second operation to remove burrs from the semi-cylindrical bearing is not necessary. Since a second operation to remove burrs is not necessary the boring operation is more economical than broaching.

Figure 1:
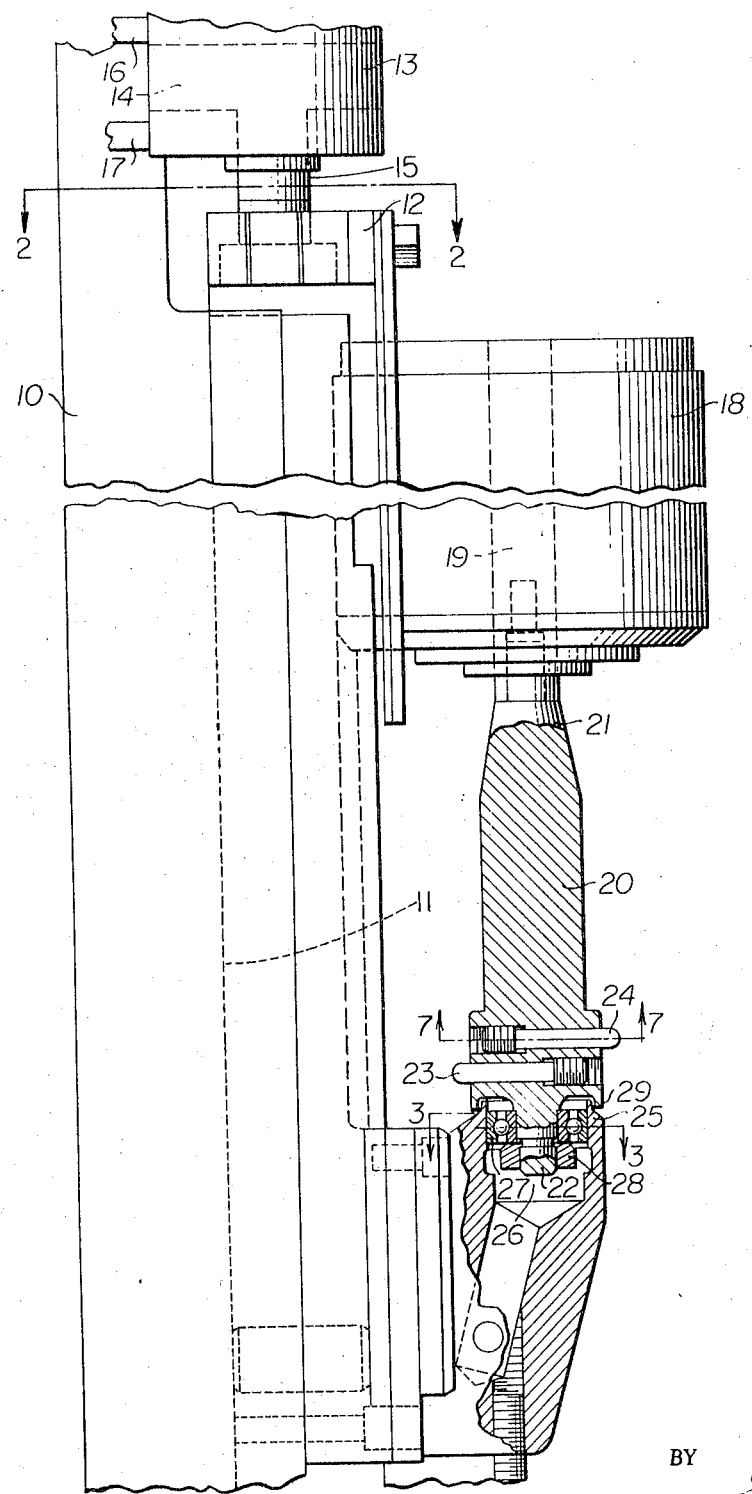
Figure 2:
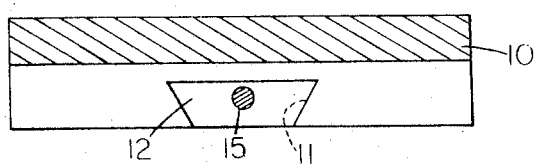
FIGURE 2 is a view taken on the line 2—2 of FIGURE 1 to a greatly reduced scale.

In the device shown in FIGURE 1 the motor 18 has two internal bearings which rigidly fix the axis of the motor. The boring bar is journaled by a bearing at its lower end and is connected to the motor. An adjustment was provided to align the axis of the boring bar with the axis of the motor. When in perfect alignment the machine can produce good bearings at a high rate of speed, but often the face of the bearing showed a distinct cutting pattern or wave. Set-up time to achieve the highly precise axial alignment was a factor. In order to reduce the tool set-up time yet achieve the precise, wave-free, high speed boring of the bearings, a universal joint assembly has been introduced between the fixed motor and the end of the boring bar, and a new lower bearing has been designed to reduce end whip due to eventual bearing wear. The universal joint permits slight misalignment between the motor axis and the axis of the boring bar without introducing any factor which shows up as malformation of the bored bearing face. Further, and very important, the joint decouples the motor bearings from the boring bar bearing. With a rigid shaft from the motor to the cutter vibrations introduced by the motor bearings would beat with vibrations introduced by the boring bar bearing to produce a beat frequency in the cutting tool. The result of this beat frequency could be seen by the naked eye on the cut surface of the bearing. While the cutting "error" due to the beat frequency was exceedingly small and really did not adversely affect the operational quality of the bearing in most instances, it made the bearing look bad, with consequent complaint by customers. The universal joint of this invention prevents undue beat-frequency vibration between the upper and lower bearings, and the new lower bearing is spring loaded to compensate for bearing wear and to keep the universal joint in its proper operating relationship.

Figure 7:
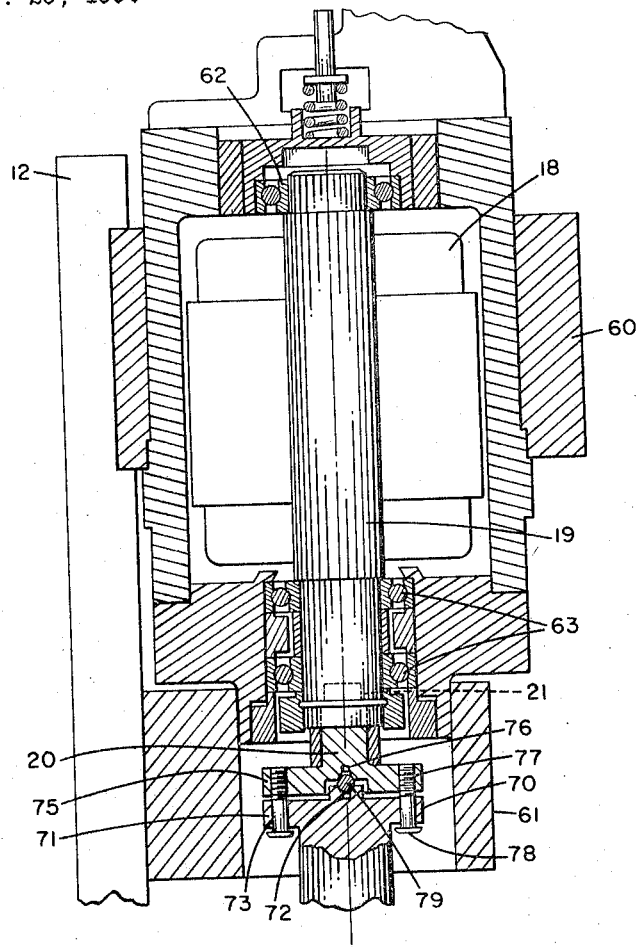
FIGURE 7 is a cross-sectional view of a modified boring machine incorporating the features of the present invention.
Figure 7:
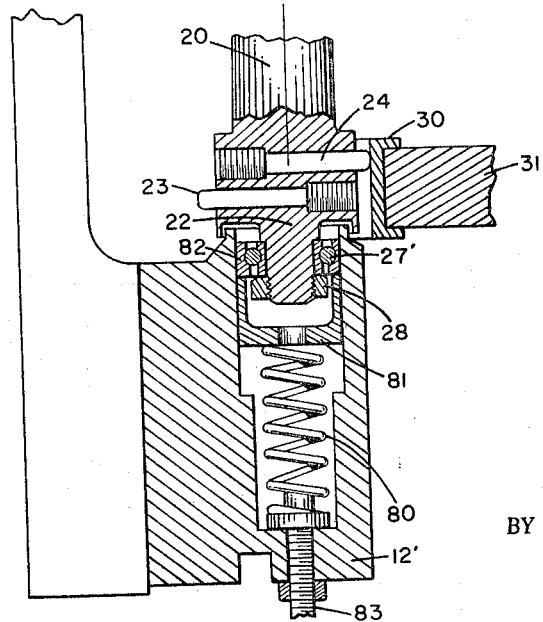

In FIGURE 7 the motor 18 is shown secured to slide 12 by means of the upper mounting ring 60 and by means of the lower mounting ring 61. The slower mounting ring 61 prevents vibration of the hydraulic system from causing motion of the lower end of the motor housing. Motor shaft 19 is firmly fixed by upper and lower bearings 62, 63 so that the axis of rotation of the motor shaft 19 is immovably fixed.

The lower end 22 of boring bar 20 is held by the radial thrust ball bearing shown in FIGURE 1 by its ability to withstand thrust loads. The upper end 21 of the boring bar is held in the lower end of the motor shaft 19, and thus the location and direction of the axis of the boring bar is rigidly fixed.

If the motor axis and the boring bar axis are misaligned to the slightest degree, the appearance of the machined surface of the bearing 30 is affected. Tests have shown that the bearings produced may operate satisfactorily, but a cutting pattern is visible on the surface of the bearing which disturbs some customers. If the axes of the motor shaft and of the boring bar are misaligned to a slightly greater extent the quality of the bearing suffers.

In order to maintain top quality bearings of perfect appearance it has been essential that the two axes be perfectly aligned. This is a condition which is extremely difficult to achieve due to the tolerances of the many parts which determine the exact locations of the four ends of the two axes. In order to obviate the requirement of exact location and alignment of the two axes a universal joint 70 is located in the boring bar 20.

The universal joint 70 is comprised of a lower plate 71 integral with the boring bar 20 and having a centrally located "V" shaped notch 72 in its upper surface, and having four unthreaded pin holes 73 through it. An upper plate 75 is integral with the upper portion of the boring bar 20 and it is provided with a centrally located "V" shaped notch 76 and four threaded pin holes 77. A ball joint 79 is secured in the notches 72, 76 and is held between the plates with the plates spaced slightly apart. Four driving pins 78 extend through the holes 73 in the lower plate 71 into threaded engagement with the holes 77 in the upper plate thereby providing a driving connection between the two plates which permits a slight amount of universal joint action without changing the position of the ball 79. Thus the center of the ball 79 becomes, in effect, the fixed location of the upper end of the axis of the boring bar. A slight amount of misalignment between the two axes, within the close tolerances which are held on all of the parts, does not adversely affect the bearing 30.

In order to keep the two plates closely coupled together a strong spring 80 is positioned between the lower end 12' of the slide 12 and a cup-shaped member 81 whose lip bears against the outer race 82 of the radial thrust bearing 27'. The spring bias is transmitted through bearing 27' to the lower end 22 of the boring bar 20 and thence to the lower plate 71 to urge the ball pivot 79 tightly against the upper plate 75.

The bearing 27' tends to wear over a long period of time but the lower end 22 of the boring bar 20 is maintained in its position by the spring 80 which keeps the bearing tight, and looseness cannot develop at the location of the ball pivot 79.

While there has been described what is at present considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed and desired to be secured by United States Letters Patent is:

1. A boring machine for finish boring in a single operation a semi-cylindrical bearing to finish the journal engaging area and two spaced apart parting line relief areas, said semi-cylindrical bearing having a longitudinal axis parallel to its parting line faces, comprising: holder means for holding said semi-cylindrical bearing with its longitudinal axis in a given direction; a boring bar having an axis of rotation and two cutters mounted thereon at locations spaced apart along said axis of rotation, one of said cutters extending further from said boring bar than the other; motor means for rotating said boring bar; means mounting and holding said boring bar at both ends thereof with its axis of rotation at a small angle relative to the axis of said bearing and for motion in respect to said bearing in a direction parallel to the longitudinal axis of said bearing while said boring bar is rotating, whereby both of said cutters remove material from the inside face of said bearing, the cutters rotating about different centers with different cutting radii, and universal joint means located in said boring bar to compensate for slight misalignment between the two ends of said boring bar.

2. A boring machine for boring a semi-cylindrical bearing having a pair of parting line faces and a longitudinal axis parallel to the parting line faces, the boring machine comprising a frame, a slide reciprocably mounted in the frame and having a longitudinal axis parallel with the axis of reciprocation, a boring bar having an axis about which it rotates, means connecting both ends of said boring bar to said slide with the bar at a small angle with respect to the longitudinal axis of the slide, a first cutter secured to the boring bar and extending out therefrom a given distance, a second cutter spaced longitudinally of the boring bar from the first cutter and secured to the boring bar and extending out therefrom a different distance, the semi-cylindrical bearing while being bored being positioned so that its longitudinal axis is parallel to the longitudinal axis of the to one end of said boring bar for rotating the boring longitudinal axis of the slide, a first cutter having a given bar, means for moving the slide and the boring bar with respect to the frame and with respect to the bearing in the direction of its longitudinal axis so that the first cutter and the second cutter remove material from the inner periphery of the bearing resulting in the formation of a journal engaging area and also resulting in the formation of parting line relief areas in the inner periphery of the bearing adjacent the parting line faces of the bearing and on either side of said journal engaging area, and universal joint means located in said boring bar between said motor means and said first and second cutters to compensate for slight misalignment between the boring bar axis and the axis of rotation of said motor means.

3. A boring machine for boring a semi-cylindrical bearing having a pair of parting line faces, the boring machine comprising a frame, a slide reciprocably mounted in the frame and having a longitudinal axis parallel with the axis of reciprocation, a boring bar having a fixed axis about which it rotates, means connecting both ends of said boring bar to said slide with the bar at an angle of less than one degree with respect to the longitudinal axis of the slide, a first cutter having a given length arranged at right angles to the boring bar and secured thereto, a second cutter having a different length arranged at right angles to the boring bar and spaced longitudinally of the boring bar from the first cutter and secured to the boring bar, the semi-cylindrical bearing while being bored being positioned so that its longitudinal axis is parallel to the longitudinal axis of the slide, motor means for rotating the boring bar and having an axis aligned with the axis of said boring bar, means for moving the slide and the boring bar with respect to the frame and with respect to the bearing in the direction of its longitudinal axis so that the first cutter and the second cutter remove material from the inner periphery of the bearing resulting in the formation of the bearing surface and of parting line relief areas in the inner periphery of the bearing adjacent the parting line faces of the bearing, and means located between the said slide and the said first and second cutters to compensate for possible slight misalignment of the fixed boring bar axis and the motor axis without changing the parallel relationship between the direction of motion of said boring bar and the longitudinal axis of said bearing.

4. A boring machine for boring a semi-cylindrical bearing having a pair of parting line faces, the boring machine comprising a frame, a slide reciprocably mounted in the frame and having a longitudinal axis parallel with the axis of reciprocation, a boring bar having a fixed axis about which it rotates, means connecting both ends of said boring bar to said slide with the bar at a small angle with respect to the longitudinal axis of the slide, a first cutter having a given length positioned adjacent one end of the boring bar and secured thereto, a second cutter having a given length spaced longitudinally of the boring bar from the first cutter and secured to the boring bar, the semi-cylindrical bearing while being bored being positioned so that its longitudinal axis is parallel to the longitudinal axis of the slide, motor means having an axis mounted on the slide and connected to the other end of the boring bar for rotating the boring bar, holding structure secured to the slide in which said one end of the boring bar is rotatably mounted to prevent whipping of the boring bar, means for moving the slide and the boring bar with respect to the frame and with respect to the bearing in the direction of its longitudinal axis so that the first cutter and the second cutter remove material from the inner periphery of the bearing adjacent the parting line faces bearing area and of parting line relief areas in the inner periphery of the bearing adjacent the parting line faces of the bearing, universal joint means located in said boring bar between said motor means and said cutter to compensate for possible slight misalignment of the motor means and the boring bar without changing the position of said cutters, and spring means urging said boring bar toward said motor means.

5. A boring machine for boring a semi-cylindrical bearing having a pair of parting line faces, the boring machine comprising a frame, a slide reciprocably mounted in the frame and having a longitudinal axis parallel with the axis of reciprocation, a boring bar, bearing means connecting one end of said boring bar to said slide at an angle of less than one degree with respect to the longitudinal axis of the slide, a first cutter having a given length arranged at right angles to the boring bar adjacent one end thereof and secured thereto, a second cutter having a greater length arranged at right angles to the boring bar and spaced longitudinally of the boring bar from the first cutter and secured to the boring bar, the semi-cylindrical bearing while being bored being positioned so that its longitudinal axis is parallel to the longitudinal axis of the slide, motor means having an axis of rotation rigidly mounted on the slide and connected to the other end of the boring bar with the motor axis and the boring bar axis aligned for rotating the boring bar, means connected to the frame and to the slide for moving the slide and the boring bar with respect to the frame and with respect to the bearing in the direction of its longitudinal axis so that the first cutter and the second cutter remove material from the inner periphery of the bearing resulting in the formation of parting line relief areas in the inner periphery of the bearing adjacent the parting line faces of the bearing, universal joint means connected to said boring bar and located between said cutters and said motor means to compensate for slight misalignment between the axis of said boring bar and the axis of said motor means without changing the said small angle between the boring bar axis and the longitudinal axis of said slide, and means biasing said bearing means, said boring bar and said universal joint toward said motor means.

6. A boring machine as set forth in claim 5, further characterized by said universal joint means comprising two spaced apart plates, one connected to said motor means and the other connected to said boring bar, each of said plates having a conical depression therein aligned respectively with the said axis of said motor means and with the said axis of said boring bar, ball pivot means mounted in said two conical depressions in said two plates and about which said two plates pivot, and driving means interconnecting said two plates and permitting slight pivoting action of said two plates about said ball pivot means without altering the relationship of the motor axis to the boring bar axis.

References Cited by the Examiner

UNITED STATES PATENTS 2,645,162 7/1953 Granade et al. ........ 90—18
2,926,570 3/1960 Bowen .............. 90—18

FOREIGN PATENTS 632,096 7/1936 Germany.

WILLIAM A. DYER, Jr., *Primary Examiner.*